United States Patent [19]

Gonzaga

[11] Patent Number: 5,669,429
[45] Date of Patent: Sep. 23, 1997

[54] TIRE REMOVING MACHINE WITH BEAD EXTRACTOR

[75] Inventor: Tullio Gonzaga, Correggio, Italy

[73] Assignee: Butler Engineering & Marketing S.r.L., Rio Saliceto, Italy

[21] Appl. No.: 647,326

[22] Filed: May 9, 1996

[30] Foreign Application Priority Data

May 23, 1995 [IT] Italy .................. VR950033 U

[51] Int. Cl.⁶ .................................. B60C 135/00
[52] U.S. Cl. .................... 157/1.24; 157/1.17
[58] Field of Search ................ 157/1.17, 1.24, 157/1.26

[56] References Cited

U.S. PATENT DOCUMENTS 5,088,539  2/1992  Mannen et al. ............ 157/1.24 X
5,490,552  2/1996  Vignoli ...................... 157/1.24

*Primary Examiner*—James G. Smith
*Attorney, Agent, or Firm*—Guido Modiano; Albert Josif; Daniel O'Byrne

[57] ABSTRACT

A tire removing machine that comprises a lateral bead extractor formed by an arm that oscillates about a fixed vertical pivot or supports a bead extractor flap and by means for the actuation of the oscillating arm. The actuation means comprise an L-shaped lever that is pivoted about the fixed vertical pivot and has one arm that abuts against a stroke limiter on the oscillating arm and another arm that is provided with a cam follower roller, and an eccentric cam that slidingly engages the other arm of the L-shaped lever and is kinematically connected to a source of rotary motion, so that the rotation of the eccentric cam imparts, by means of the L-shaped lever, a controlled oscillating motion to the L-shaped lever.

5 Claims, 4 Drawing Sheets

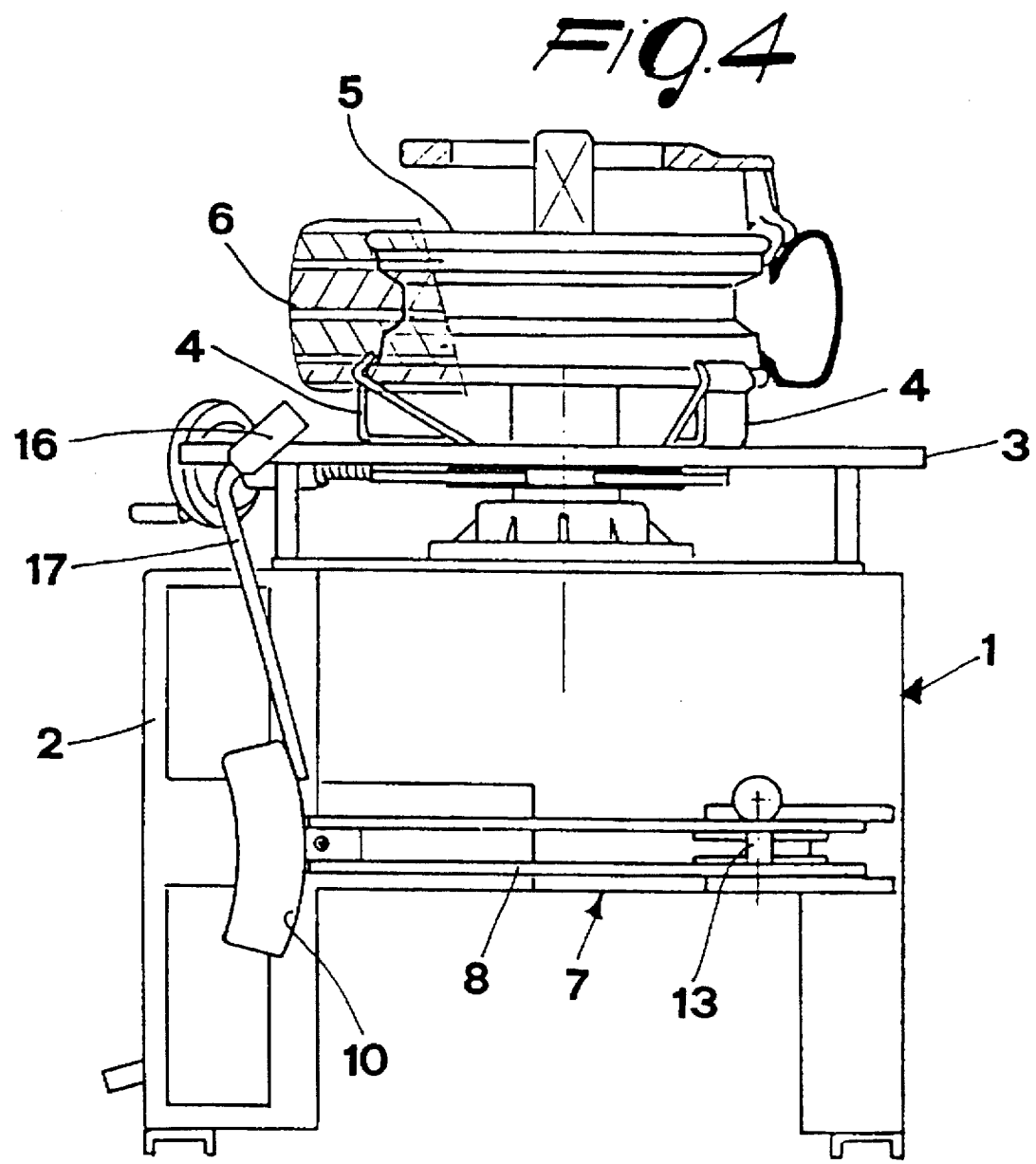

TIRE REMOVING MACHINE WITH BEAD EXTRACTOR

BACKGROUND OF THE INVENTION

The present invention relates to a tire removing machine provided with a lateral bead extractor.

The tire removing machine according to the present invention is of the type in which bead extraction, which is performed before removing a tire from its wheel, occurs while the wheel unit is arranged laterally to the tire removing machine, i.e., in a position that is different from the one in which tire removing and mounting occur; these operations are generally performed while the wheel is centered and locked on the platform of the machine.

Lateral bead extractors have already been proposed which are substantially constituted by an oscillating arm, in which one end is pivoted to the supporting structure of the tire removing machine and the other end is provided with a fixed bead extractor flap, and by a traction device for the arm that is meant to pull the arm and therefore the flap toward the edge of a tire to be removed, which is arranged between the footing of the bead extractor and the oscillating arm.

Conventional traction devices are constituted by a winch with a pulling chain or by a hydraulic or pneumatic double-action cylinder and piston unit. However, they are rather slow and require complicated control devices for their controlled actuation, and therefore they significantly affect the overall cost of the bead extractor and require frequent maintenance.

SUMMARY OF THE INVENTION

The aim of the present invention is to eliminate or substantially reduce the drawbacks described above, which can be observed with conventional tire removing machines.

Within this aim, an object of the present invention is to provide a tire removing machine that is provided with a lateral bead extractor that has a relatively simple structure, is highly reliable, and can be adapted to a wide range of sizes of the tires to be removed.

This aim, this object, and others which will become apparent hereinafter are achieved by a tire removing machine according to the invention, which comprises a lateral bead extractor that is formed by an oscillating arm that oscillates about a fixed vertical pivot and supports a bead extractor flap and by means for the actuation of the oscillating arm, and is characterized in that said actuation means comprise an L-shaped lever that is pivoted about the fixed vertical pivot and has one arm that abuts against a stroke limiter on the oscillating arm and another arm that is provided with a cam follower roller, and an eccentric cam that slidingly engages said another arm of the L-shaped lever and is kinematically connected to a source of rotary motion, so that the rotation of the eccentric cam imparts a controlled oscillating motion to the oscillating arm.

BRIEF DESCRIPTION OF THE DRAWINGS

The invention is described further hereinafter with reference to the accompanying drawings, wherein:

FIG. 4 is a schematic lateral elevation view of a tire removing machine with a fixed platform and a rotating tool, provided with a lateral bead extractor, according to the invention.

In the various figures, identical or similar parts or components have been designated by the same reference numerals.

DESCRIPTION OF THE PREFERRED EMBODIMENTS

Figure 3:
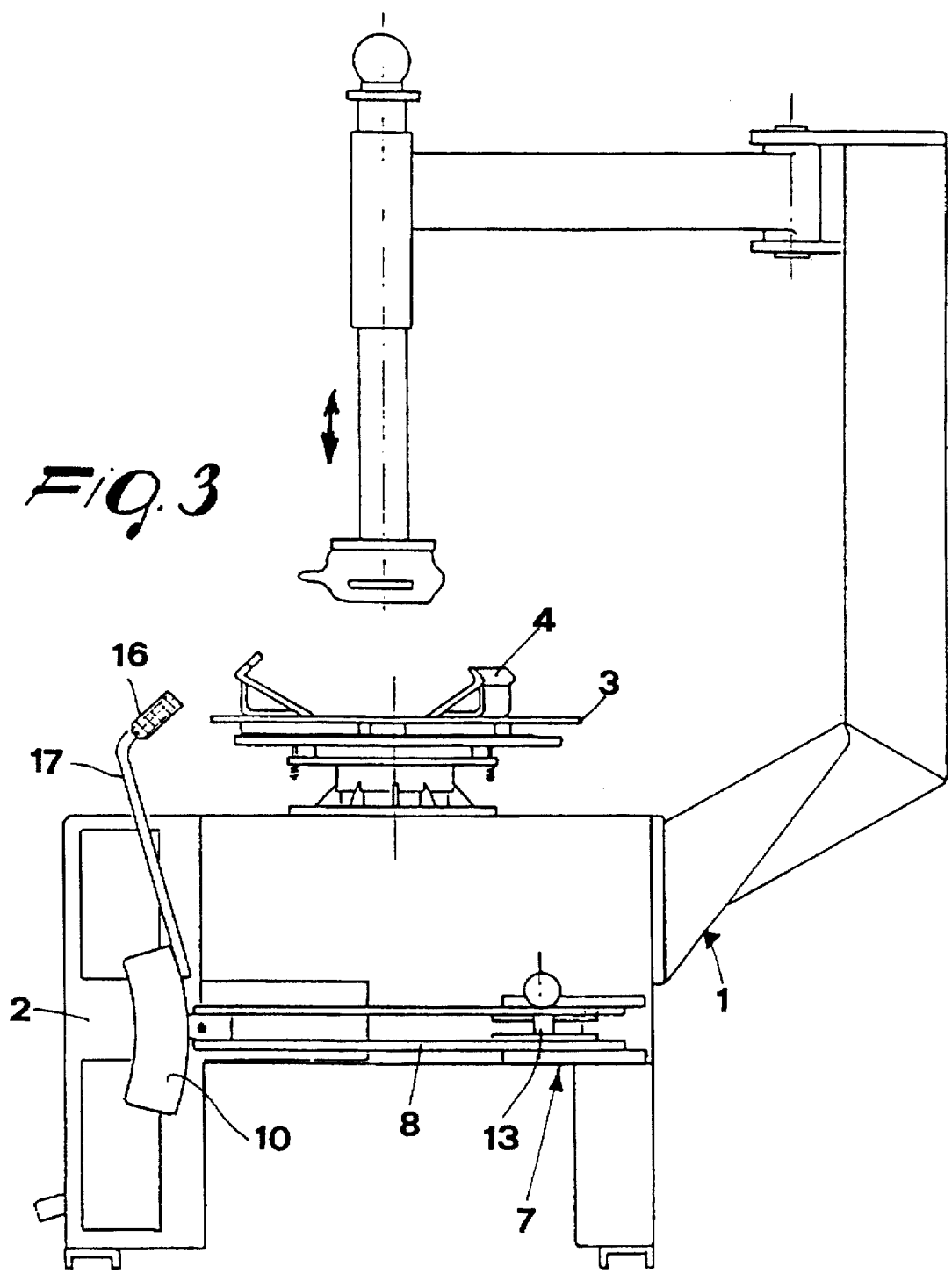
FIG. 3 is a schematic lateral elevation view of a tire removing machine with fixed tool and rotating platform, provided with a lateral bead extractor, according to the invention.

With reference to the drawings, it can be seen that a tire removing machine 1 according to the invention, whether of the fixed-tool type—such as the one shown in FIG. 3—or of the rotary-tool type—such as the one shown in FIG. 4—is generally constituted by a footing or supporting structure 2, a platform 3 that is supported by the footing and is provided with a plurality of claws 4 for engaging the wheel 5 of a tire-fitted wheel unit, provided with a tire 6 to be removed, and retaining it in working position. The platform 3 is provided with a claw actuation device (for example of the so-called rotary clamp type for the tire removing machine of FIG. 3 and of the fixed-clamp type for the machine of FIG. 4).

A motor (not shown in the drawings) is installed in the footing 2 and constitutes the source of motion for a certain number of functions, as will become apparent hereinafter.

The tire removing machine 1 is laterally provided with a bead extractor 7 that has an arm 8 which is mounted, at its proximal end, so that it can rotate about a pivot 9 that has a vertical axis and is supported by the footing of the tire removing machine; said arm supports a bead extractor flap 10 at its distal end. The arm 8 can therefore perform swinging angular strokes, so that it can oscillate between a position in which the bead extractor flap 10 is relatively spaced from the footing 2 and one in which it is adjacent to said footing.

The arm 8, at its pivoting end, i.e., at the end that is furthest from the bead extractor flap 10, can be actuated by actuation means formed by an L-shaped lever 11, which is pivoted about the fixed vertical pivot 9, and by an eccentric element 12, which interacts with the L-shaped lever 11 and is kinematically connected to the source of motion of the tire removing machine, so that it is rotated, on command, in the direction indicated by the arrow F. The eccentric element 12 is shown in the drawings in the form of an eccentric cam, but it might be constituted by another cam having an adapted configuration, for example, of the heart-shaped type, so that the bead extractor flap 10 presses against the tire with constant force.

The L-shaped lever 11 has an arm 11a that abuts against a stroke limiter 13 on the oscillating arm. The stroke limiter 13 can preferably be positioned in a plurality of adapted seats or holes 14 formed in the arm 8 at a preset distance from the fixed pivot 9, so as to be able to vary the breadth of the outward angular stroke of said arm according to the dimensions of the tire whose bead must be extracted, which can be placed between the side of the footing 2 and the arm 8.

The other arm 11b of the L-shaped lever 11 is provided with a cam follower roller 15 that is permanently slidingly engaged with the peripheral surface of the eccentric element 12. Accordingly, the rotation of the eccentric element 12 in the direction indicated by the arrow F produces a controlled rotary motion of the L-shaped lever 11, which by means of its own arm 11a and the stroke limiter 13 applies torque to the arm 8 about the pivot 9.

Figure 1:
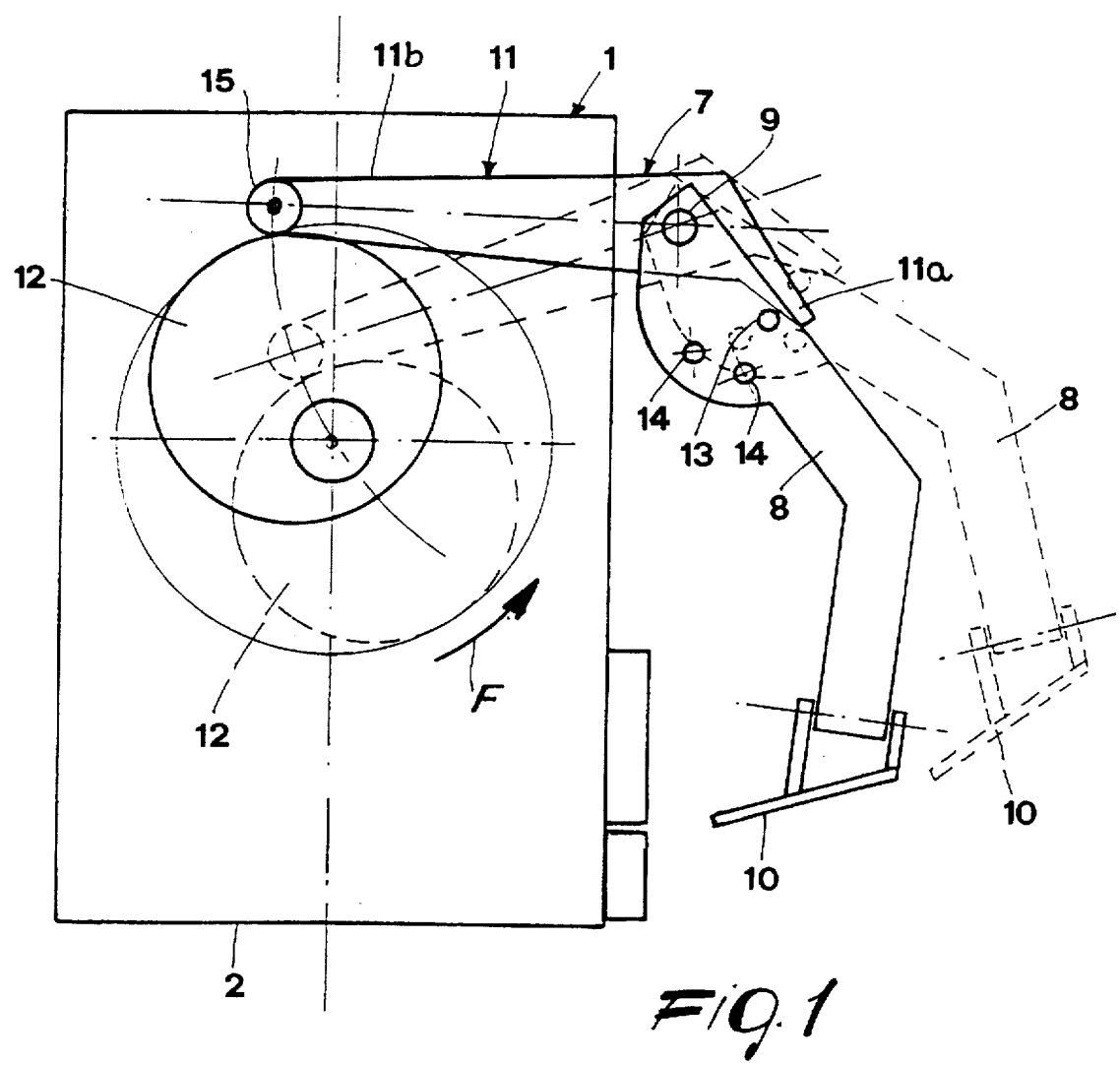
FIGS. 1 and 2 are two schematic top views of the footing of a tire removing machine provided with a lateral bead extractor according to the invention.
Figure 2:
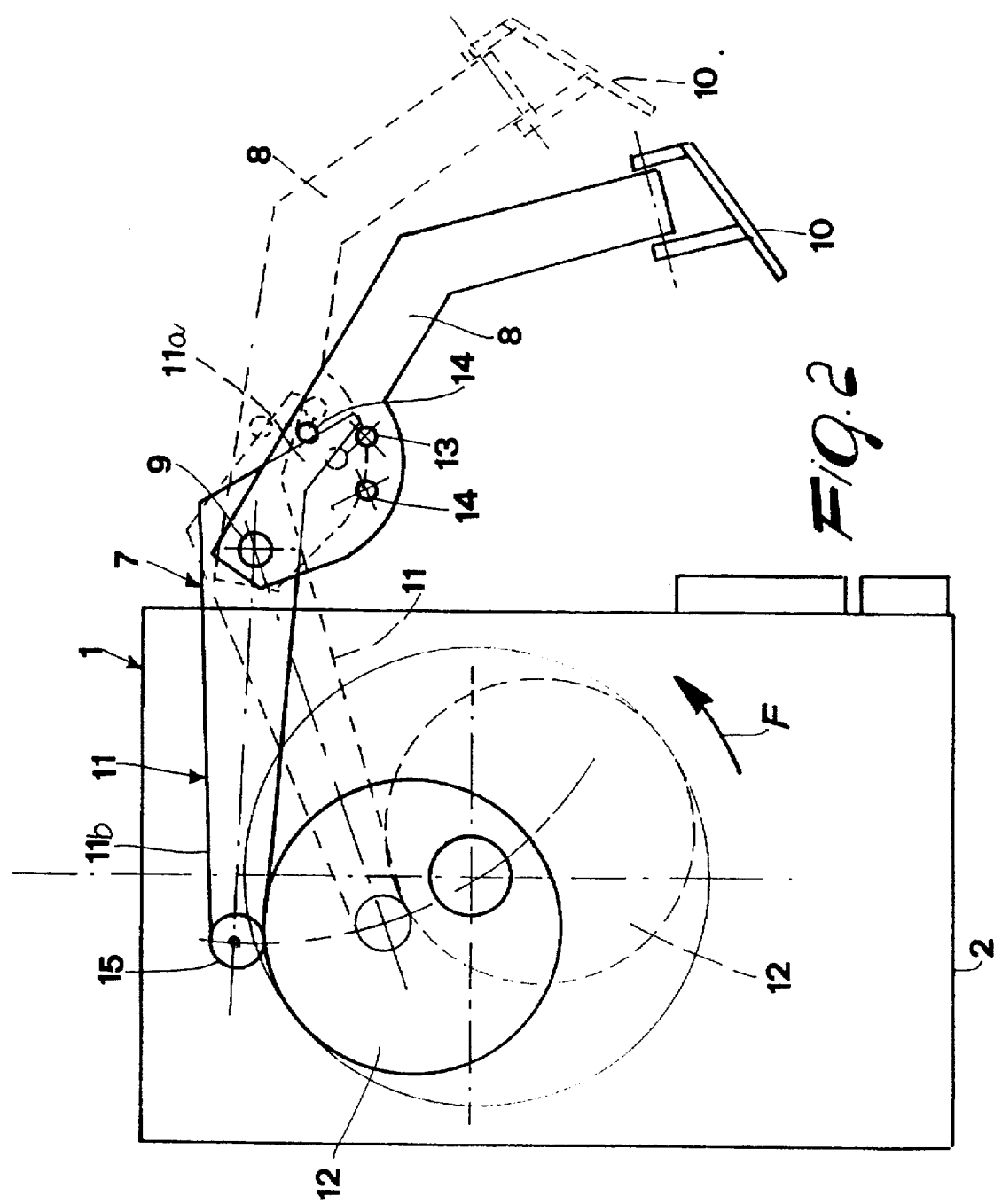

The outward movement of the arm 8, once the eccentric element 12 has turned into the position shown in dashed lines in FIGS. 1 and 2, can occur automatically, for example if the arm 8 is spring-loaded, or manually, by acting on the end handle 16 of an actuation lever 17 that is fixed to the flap 10 or directly to the arm 8 proximate to the flap (FIGS. 3 and 4).

From the above description it is evident that a tire removing machine provided with a bead extractor according to the invention is capable of achieving the intended aim and object as regards both extreme simplicity and reliability of the device for actuating the oscillating arm 8 and the possibility of adapting to various tire widths.

The above described tire removing machine is susceptible of constructive modifications and variations within the scope of the protection defined by the spirit of the claims.

The materials and the dimensions may be any according to the requirements.

What is claimed is:

1. A tire removing machine, comprising a lateral bead extractor that is formed by an oscillating arm that oscillates about a fixed vertical pivot and supports a bead extractor flap and by means for the actuation of the oscillating arm, wherein said actuation means comprise an L-shaped lever that is pivoted about the fixed vertical pivot and has one arm that abuts against a stroke limiter on the oscillating arm and another arm that is provided with a cam follower roller, and an eccentric cam that slidingly engages said another arm of the L-shaped lever and is kinematically connected to a source of rotary motion, so that the rotation of the eccentric cam imparts, by means of the L-shaped lever, a controlled oscillating motion to the oscillating arm.

2. A tire removing machine according to claim 1, wherein said cam-follower roller of said another arm is slidingly engaged with said eccentric cam.

3. A tire removing machine according to claim 1, wherein said stroke limiter for said one arm of the L-shaped lever can be moved in a plurality of positions on the oscillating arm to adjust the extent of the angular stroke allowed to said oscillating arm.

4. A tire removing machine according to claim 1, wherein said stroke limiter is constituted by a pivot or pin protruding from the oscillating arm.

5. A tire removing machine according to claim 1, wherein said eccentric element is a cam with a heart-shaped rim profile.

* * * * *